United States Patent [19]

Sizer et al.

[11] Patent Number: 5,843,374
[45] Date of Patent: Dec. 1, 1998

[54] METHOD AND APPARATUS FOR STERILIZING PACKAGING

[75] Inventors: Charles Sizer, Hawthorne Woods; Sevugan Palaniappan, Grayslake; Victor Holbert, Buffalo Grove, all of Ill.

[73] Assignee: Tetra Laval Holdings & Finance, SA, Pully, Switzerland

[21] Appl. No.: 756,850

[22] Filed: Nov. 26, 1996

Related U.S. Application Data

[63] Continuation-in-part of Ser. No. 728,723, Oct. 11, 1996.

[51] Int. Cl.$^6$ ............................................. A61L 2/00
[52] U.S. Cl. ............................... 422/24; 422/28; 422/31; 53/425
[58] Field of Search .................. 422/24, 28, 31; 53/425

[56] References Cited

U.S. PATENT DOCUMENTS

| | | | |
|---|---|---|---|
| 3,738,080 | 6/1973 | Reil | 53/180 |
| 3,911,642 | 10/1975 | Ernstsson et al. | 53/28 |
| 4,069,753 | 1/1978 | Gunther | 210/64 |
| 4,121,107 | 10/1978 | Bachman | 250/455 |
| 4,289,728 | 9/1981 | Peel et al. | 422/24 |
| 4,366,125 | 12/1982 | Kodera et al. | 422/295 |
| 4,375,145 | 3/1983 | Mosse et al. | 53/425 |
| 4,448,750 | 5/1984 | Fuesting | 422/20 |
| 4,590,740 | 5/1986 | Rodocker | 53/426 |
| 4,656,813 | 4/1987 | Baldini et al. | 53/410 |
| 4,797,255 | 1/1989 | Hatanaka et al. | 422/28 |
| 4,809,485 | 3/1989 | Nielsen | 53/503 |
| 4,848,063 | 7/1989 | Niske | 53/451 |
| 4,896,768 | 1/1990 | Anderson | 206/210 |
| 4,910,942 | 3/1990 | Dunn et al. | 53/425 |
| 5,073,268 | 12/1991 | Saito et al. | 210/638 |
| 5,122,340 | 6/1992 | Shimamura et al. | 422/28 |
| 5,129,212 | 7/1992 | Duffey et al. | 53/426 |
| 5,135,714 | 8/1992 | Wang | 422/23 |
| 5,144,670 | 9/1992 | Negishi | 381/439 |
| 5,155,980 | 10/1992 | Mansson et al. | 53/551 |
| 5,158,816 | 10/1992 | Rausing | 428/35.8 |
| 5,213,759 | 5/1993 | Castberg et al. | 422/44 |
| 5,248,665 | 9/1993 | Schulte et al. | 210/748 |
| 5,326,542 | 7/1994 | Sizer et al. | 422/291 |
| 5,350,568 | 9/1994 | Tuckner et al. | 422/300 |
| 5,428,078 | 6/1995 | Cohen et al. | 522/2 |
| 5,433,920 | 7/1995 | Sizer et al. | 422/24 |
| 5,445,793 | 8/1995 | Tuckner et al. | 422/28 |
| 5,489,022 | 2/1996 | Baker | 206/439 |
| 5,494,691 | 2/1996 | Sizer | 426/392 |

FOREIGN PATENT DOCUMENTS 9218170  10/1992  WIPO.

*Primary Examiner*—Edward J. Cain
*Attorney, Agent, or Firm*—Michael A. Catania

[57] ABSTRACT

A method and apparatus for sterilizing packaging through irradiation with an excimer ultraviolet lamp which may be integrated on a packaging machine. The excimer ultraviolet lamp emits radiation at a substantially monochromatic wavelength within the ultraviolet band of the electromagnetic spectrum. The excimer ultraviolet lamp is composed of a quartz shell containing one of the following gaseous compounds: $Ar_2$, $Kr_2$, $Xe_2$, ArCl, KrCl, KrF or XeCl. The KrCl gas excimer ultraviolet lamp which generates a wavelength of 222 nanometers is of particular interest for the present invention. In one embodiment, the lamp has a central aperture for flowing through a cooling fluid to remove heat from the lamp. If the excimer ultraviolet lamp is integrated on a form, fill and seal machine, the cooling fluid may be the desired contents filled into a container fabricated on the form, fill and seal machine. The materials sterilized by the present invention are fabricated into many different containers such as flexible pouches, stand-up pouches, parallelpiped containers and gable top cartons. The material may be subjected to a sterilant prior to irradiation by the excimer ultraviolet lamp. The sterilant may be hydrogen peroxide, peracid, ozone or the like. The concentration of the sterilant may have a range of between 1% to 55%.

19 Claims, 8 Drawing Sheets

METHOD AND APPARATUS FOR STERILIZING PACKAGING

TECHNICAL FIELD

This is a continuation-in-part of copending application Ser. No. 08/728,723 filed on Oct. 11, 1996.

The present invention relates to an apparatus and method for sterilizing packaging through irradiation with ultraviolet light. Specifically, the present invention relates to apparatus and method for sterilizing packaging through irradiation with an excimer ultraviolet lamp subsequent to subjecting the packing material to hydrogen peroxide.

BACKGROUND

It is well known that heat-sealable polymer materials may be fabricated into disposable containers for the packaging of liquids and other flowable materials. These containers are commonly used as consumer packaging for containing fruit juices and milk, and may have the form of a flexible pouch or parallelpiped container. The containers, once filled with a desired contents and sealed at a production center, are transported to a store for the ultimate distribution to the consumer. The consumer, with his or her subjective preferences, will have the choice of purchasing a flowable material contained in a flexible pouch or parallelpiped container, or in a more traditional package such as a plastic bottle, paper carton or metal can. In order to overcome the consumer's time-fortified preferences for the more traditional packaging, the disposable polymer containers must be able to provide the consumer with an assurance that the polymer container is safe (the contents) and is able to withstand the same handling treatment as the traditional package.

A polymer container as consumer packaging for flowable materials has numerous advantages over traditional packages such as glass bottles, paper cartons and high density polyethylene jugs. Compared to these traditional packages, a polymer pouch or parallelpiped container consumes less raw material, requires less space in a landfill, is recyclable, can be processed easily, requires less storage space, requires less energy for chilling because of increased heat transference, and can be readily incinerated. A polymer pouch is also reusable as a general purpose storage bag.

Flowable materials are usually packaged in a polymer pouches or parallelpiped containers through a vertical form, fill and seal machine. The operation of the form, fill and seal machine commences with the unwinding of a web of thermoplastic film which is then formed into a continuous tube in a tube forming section, by sealing the longitudinal edges of the film together to form a fin seal (the forming aspect of the machine). The tube thus formed is pulled vertically toward a filling station. The tube is then collapsed across a transverse cross-section of the tube, the position of the cross-section being at a sealing device. The sealing device makes a first transverse heat seal at the collapsed portion of the tube thereby creating an airtight seal across the tube. The sealing device generally comprises a pair of jaws which contain a heating element, the jaws closing upon the tube and the heating element heating to form the airtight seal. Subsequent to sealing the tube and prior to the opening of the jaws, a predetermined quantity of a desired contents is deposited into the tube to a predetermined level upward from the first transverse seal (the filling aspect of the machine). The tube is then moved downward to a predetermined position whereby the level of the desired contents is below the jaws of the sealing device. The jaws of the sealing device are again closed, thereby collapsing the tube at a second transverse section and creating a second transverse heat seal (the sealing aspect of the machine). During the second closing of the jaws, the sealing device clamps, seals and severs the tube transversely. A pouch filled with a flowable material is now ready for further transportation. For the parallelpiped container, subsequent to the severing of the tube, the container is further manipulated to form the parallelpiped container shape. Also, the parallelpiped container is formed into a substantially rectangular shape prior to the first transverse sealing. Thus, during the second closing, the sealing device has sealed the top of the filled pouch, severed this pouch from the rest of the tube, and sealed the bottom of the next-to-be filled pouch. An example of a form, fill and seal machine is the TETRA POUCH™, available from Tetra Pak, Inc., Chicago, Ill.

In the production of flowable materials in polymer containers, efficiency is measured by the speed in which such containers may be formed, filled and sealed. One aspect of the machines which may lead to decreased efficiency is the sterilization process for aseptic packaging. Presently, the sterilization process involves ultraviolet irradiation of the material prior to filling of the containers with a desired contents. The present ultraviolet sterilization apparatus involves a series of parallel mercury lamps, aluminum reflectors and a water cooling system contained within glass cover. These lamps operate at very high temperatures which have the possibility of damaging the material undergoing sterilization. The exposure time required for an effective kill greatly decreases the speed at which these machines may be operated at during production. An example of such a patent is Bachman, U.S. Pat. No. 4,121,107, for an Apparatus For Automatic Low-Bacteria To Aseptic Filling And Packing Of Foodstuffs which discloses an apparatus that exposes the packaging material to a set of ultraviolet light radiating mercury lamps for at least one second.

Another method for sterilizing packaging material is to utilize pulses of light to irradiate the material. An example of such a method is Dunn et al, U.S. Pat. No. 4,871,559, for Methods For Preservation Of Foodstuffs. Dunn et al discloses a method to use pulsed ultraviolet light originating from a flashlamp system to sterilize food packaging. Such a system generates high temperatures and also generates polychromatic radiation. Still other methods employ a beam of an ultraviolet or infrared laser diffracted into the interior of a partially-formed container to sterilize the container which has been coated with hydrogen peroxide.

The foregoing patents, although efficacious in the sterilization of packaging, are not the denouement of the problems of the packaging industry. There are still unresolved problems which compel the enlargement of inventions in the packaging industry. What is needed is a sterilization apparatus which may be integrated with current packaging machines, which is capable of effectively sterilizing packaging material without decreasing the operation speed of the machine, and which does not generate excessively high temperatures.

SUMMARY OF THE INVENTION

The present invention provides a sterilization apparatus to meet the unfulfilled needs of the packaging industry. The present provides for the effective sterilization of packaging material in an expedited manner while not generating excessively high temperatures.

One aspect of the invention is an apparatus for sterilizing transparent packaging material. The transparent packaging material has an interior surface and an exterior surface. The apparatus comprises means for applying a ultraviolet radiation synergetic sterilant to the interior surface of the transparent packaging material and an ultraviolet radiation source oriented to directly irradiate the exterior surface with ultraviolet radiation. The interior surface is sterilized through transmission of the ultraviolet radiation through the transparent packaging material. The ultraviolet radiation source may be an excimer ultraviolet lamp. The ultraviolet radiation source may emit a substantially monochromatic wavelength. The excimer ultraviolet lamp may be composed of a quartz shell containing a gas selected from the group consisting of $Ar_2$, $Kr_2$, $Xe_2$, ArCl, KrCl, KrF and XeCl.

The transparent packaging material may be fabricated into a partially-formed container. The transparent packaging material is fabricated into a transparent bottle. The ultraviolet radiation synergetic sterilant may have a concentration range of between 1% and 55%. Alternatively, the ultraviolet radiation synergetic sterilant may have a concentration range of a between 2% to 16%. The transparent material may be sterilized at a rate of twenty meters per second. The transparent material may be fabricated into a pouch. The ultraviolet radiation source may provide uniform sterilization of the interior surface of the transparent material. The ultraviolet radiation synergetic sterilant may be hydrogen peroxide. The means for applying a ultraviolet radiation synergetic sterilant may be a sprayer which coats the interior surface with the sterilant. Alternatively, the means for applying a ultraviolet radiation synergetic sterilant may be a bath of the sterilant. The apparatus may also have a reflector for reflecting incident ultraviolet radiation toward the material. The reflector may have a parabolic shape.

Another aspect of the present invention is a method for sterilizing a transparent material. The transparent material having an interior surface and an exterior surface. The first step of the method is applying an ultraviolet radiation synergetic sterilant to the interior surface of the transparent packaging material. The next step is directly irradiating the exterior surface with ultraviolet radiation from an ultraviolet radiation source thereby sterilizing the interior surface through transmission of the ultraviolet radiation through the transparent packaging material. The final step is removing any excess sterilant from the interior surface of the transparent packaging material.

The method may further comprise the step of fabricating a transparent bottle from the sterilized transparent packaging material. Alternatively, the method may further comprise the step of fabricating a transparent pouch from the sterilized transparent packaging material. The ultraviolet radiation synergetic sterilant used in performing the method may be hydrogen peroxide.

There is illustrated in FIG. 8 a cross-sectional view of a transparent bottle which may be sterilized using the present invention.

Another aspect of the present invention is an apparatus for sterilizing a material undergoing fabrication into a container on a form, fill and seal machine. The container will be filled with a desired contents. The apparatus comprises means for applying a ultraviolet radiation synergetic sterilant to the material, an ultraviolet radiation source oriented to directly irradiate the material with ultraviolet radiation thereby sterilizing the material, and a wiper for removing excess sterilant from the material.

The ultraviolet radiation source may be an excimer ultraviolet lamp. The ultraviolet radiation source may emit a substantially monochromatic wavelength. The excimer ultraviolet lamp may be composed of a quartz shell containing a gas selected from the group consisting of $Ar_2$, $Kr_2$, $Xe_2$, ArCl, KrCl, KrF and XeCl. The ultraviolet radiation synergetic sterilant may have a concentration range of between 1% and 55%. Alternatively, the ultraviolet radiation synergetic sterilant may have a concentration range of between 2% and 16%. The material may be sterilized at a rate of twenty meters per second. The material may be fabricated into a pouch. The ultraviolet radiation source may provide uniform sterilization of the material. The ultraviolet radiation synergetic sterilant may be hydrogen peroxide, hydrogen peroxide based sterilants, ozone or the like.

The means for applying a ultraviolet radiation synergetic sterilant may be a sprayer which coats the interior surface with the sterilant. Alternatively, the means for applying a ultraviolet radiation synergetic sterilant is a bath of the sterilant. The form, fill and seal machine may fabricate the material into a pouch. Alternatively, the form, fill and seal machine may fabricate the material into a parallelpiped container. The apparatus may be disposed along the form, fill and seal machine prior to a longitudinal sealing of the material. The material may be transparent. The ultraviolet radiation source may be U shape having two elongated projections merging at a base, the two elongated projections oriented substantially parallel to the material thereby allowing the material to pass between the two elongated projections for irradiation of the material.

Still another aspect of the present invention is a method for sterilizing a material undergoing fabrication into a container on a form, fill and seal machine The first step of the method is applying an ultraviolet radiation synergetic sterilant to the material. The next step is directly irradiating the material with ultraviolet radiation from an ultraviolet radiation source thereby sterilizing the material. The final step of the method is removing any excess sterilant from the material.

The method may further comprise the step of forming the material into a pouch. Alternatively, the method may further comprise the step of forming the material into a parallelpiped container. The apparatus may be disposed along the form, fill and seal machine prior to a longitudinal sealing of the material. The method may further comprise the step of sealing the material longitudinally subsequent to the step of removing the excess sterilant. The method may still further comprise sealing the material transversely thereby partially forming the container subsequent to the step of sealing the material longitudinally. The method may still further comprise filling the partially formed container with the desired contents subsequent to the step of sealing the material transversely. The material may be transparent. The ultraviolet radiation source is shape having two elongated projections merging at a base, the two elongated projections oriented substantially parallel to the material thereby allowing the material to pass between the two elongated projections for irradiation of the material.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE DRAWINGS

Several features of the present invention are further described in connection with the accompanying drawings in which:

There is illustrated in FIG. 1 a top cross-section view of a preferred embodiment of an excimer ultraviolet lamp of the present invention.

Figure 2:
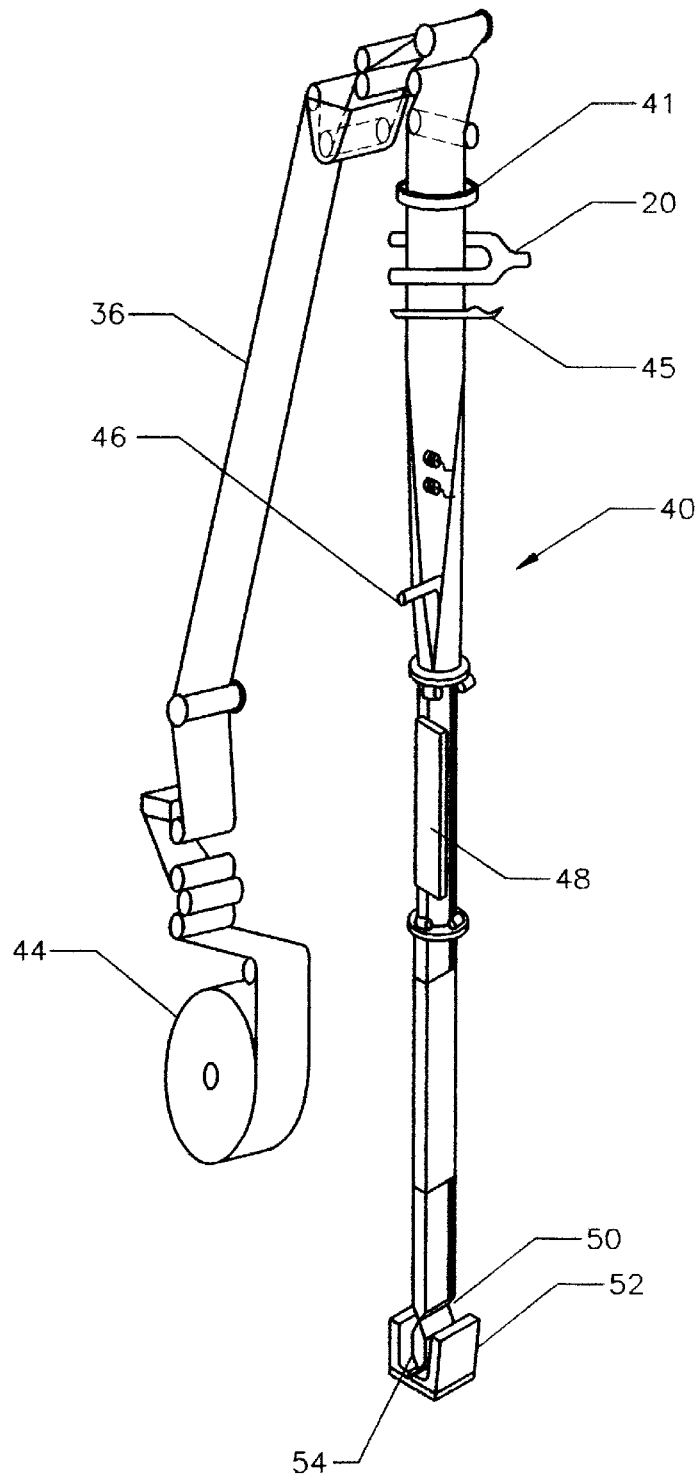

There is illustrated in FIG. 2 a side view of an apparatus of the present invention integrated on a vertical form, fill and seal machine.

Figure 3:
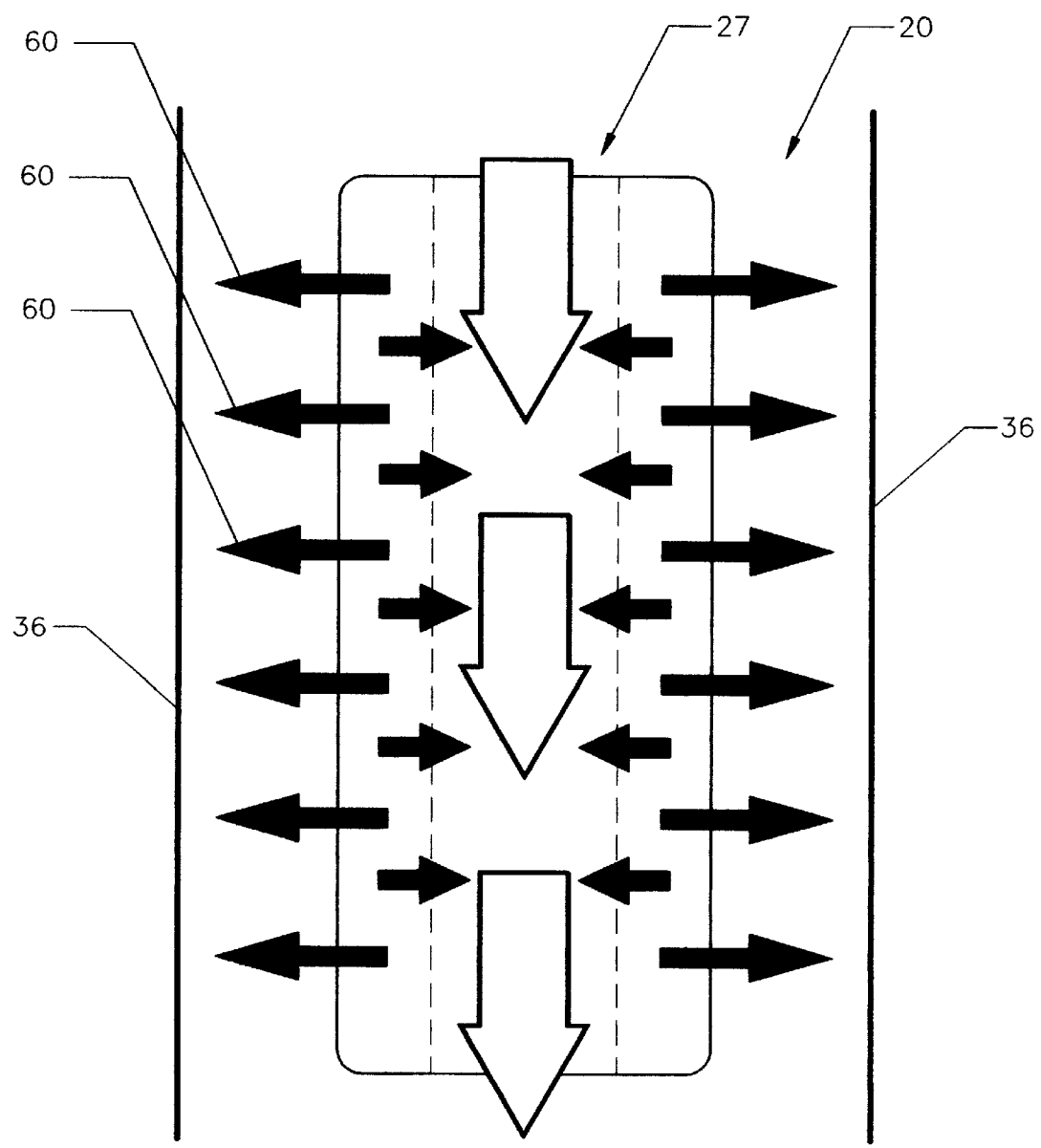

There is illustrated in FIG. 3 a cross-section side view of an apparatus of the present invention integrated on a vertical form, fill and seal machine.

Figure 4:
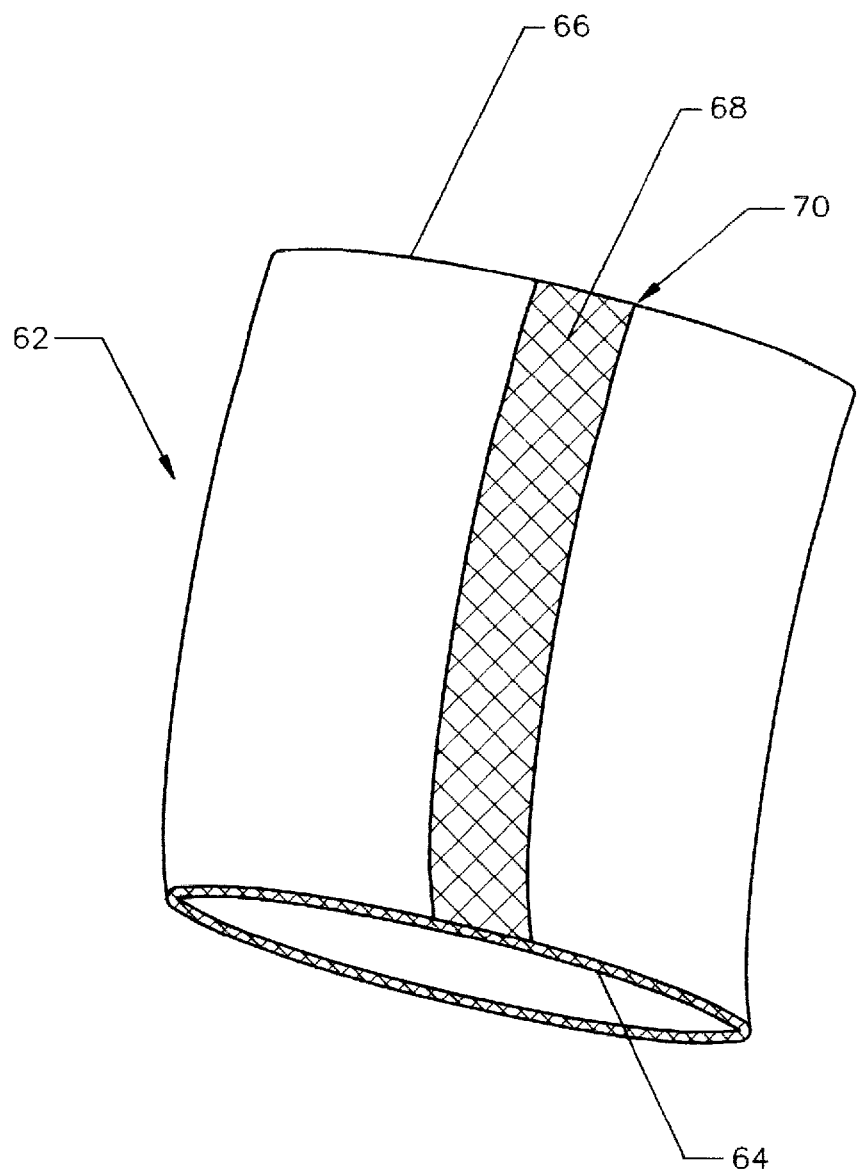

There is illustrated in FIG. 4 an aseptic pouch sterilized in accordance with the present invention.

Figure 5:
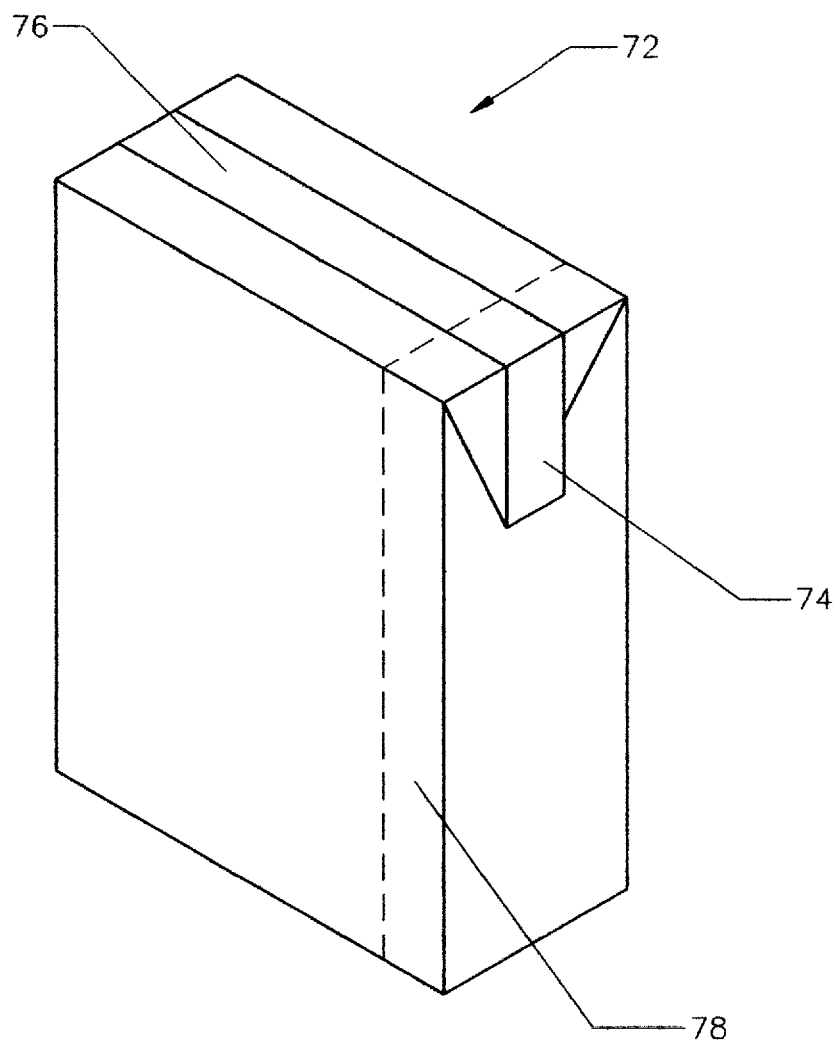

There is illustrated in FIG. 5 a parallelpiped container sterilized in accordance with the present invention.

Figure 6:
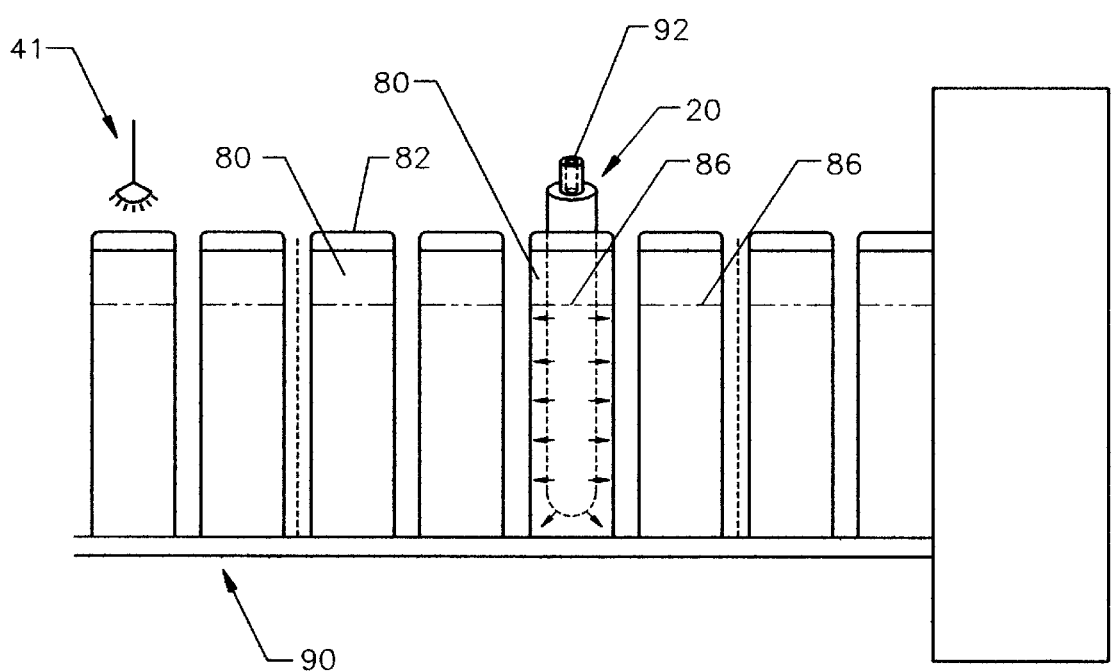

There is illustrated in FIG. 6 a schematic view of one embodiment of an apparatus of the present invention integrated on a conveying system for gable top cartons.

Figure 7:
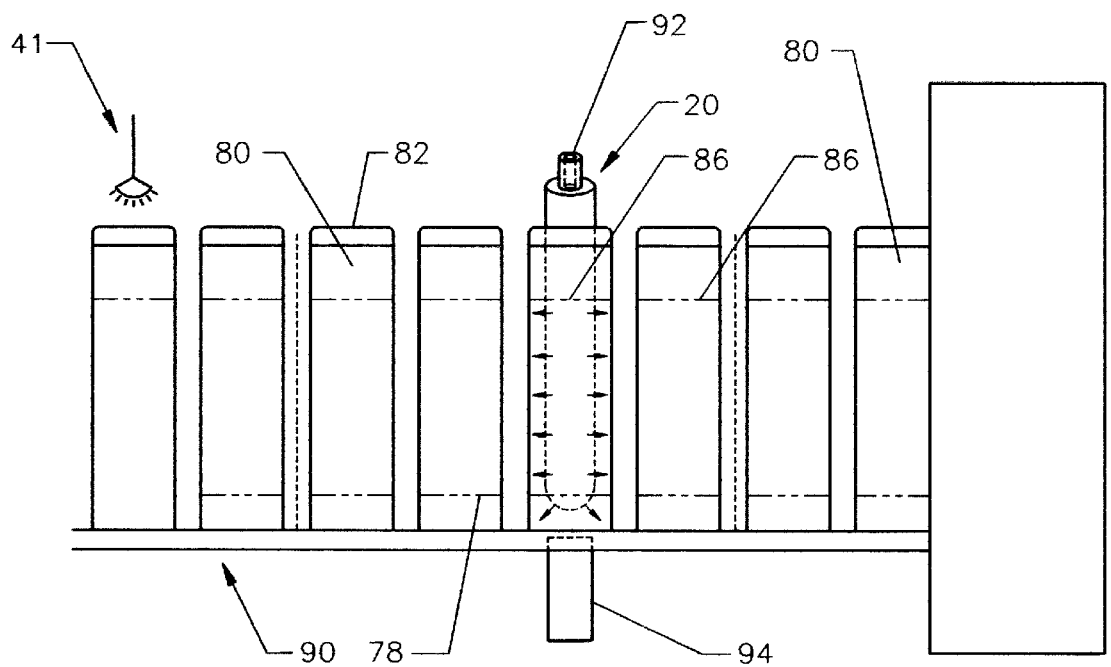

There is illustrated in FIG. 7 a schematic view of an alternative embodiment of an apparatus of the present invention integrated on a conveying system for gable top cartons.

Figure 8:
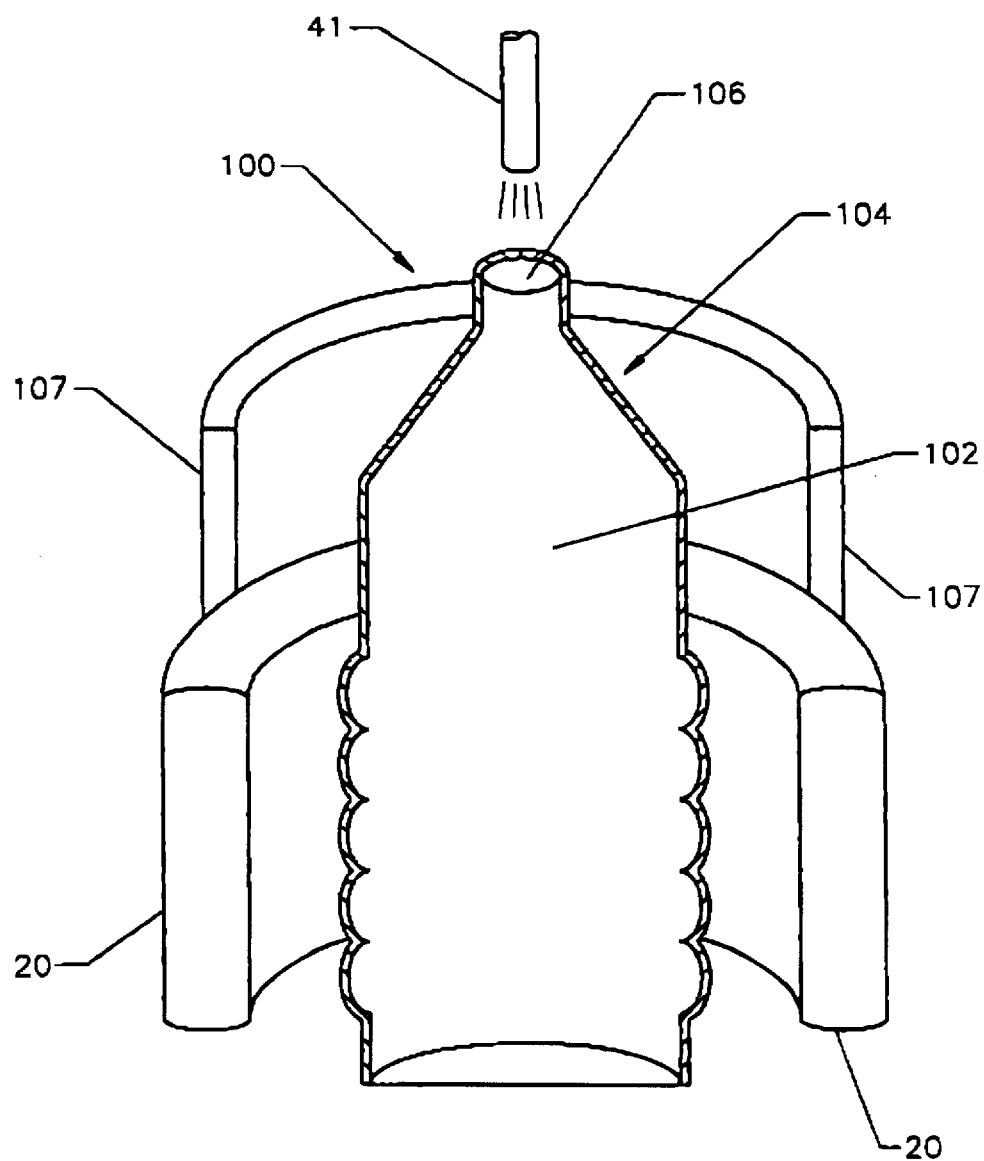

There is illustrated in FIG. 8 a cross-sectional view of a transparent bottle which may be sterilized using the present invention.

DETAILED DESCRIPTION OF THE PREFERRED EMBODIMENTS

The present invention applies to the sterilization of packaging materials undergoing fabrication to a container for flowable or pumpable materials. The present invention may also be utilized to fabricate an aseptic container. Such a container may take the form of a plastic bottle, a flexible pouch, a stand-up pouch, a parallelpiped container, a gabled top carton, or the like. An application of the present invention is with the fabrication of a container on a vertical form, fill and seal machine which is utilized to manufacture flexible pouches, stand-up pouches and parallelpiped containers. Another application of the present invention is with containers fabricated along a horizontal conveyance system such as that used for the fabrication of gabled top cartons. Still another application is with transparent materials such as used to fabricate bottles prior to the filling of the bottle with a desired contents. Although application of the present invention has been described in reference to fabrication and filling with the above-mentioned containers, those skilled in the pertinent art will recognize that the application of the present invention with the fabrication of other containers are within the scope of the present invention.

A preferred ultraviolet radiation source is an excimer lamp. However, the present invention may be practiced other ultraviolet lamps which emit a favorable ultraviolet radiation. These ultraviolet radiation sources may be mercury based lamps which emit a preferred wavelength.

Excimer Ultraviolet Technology

The present invention is based on excimer ultraviolet technology. Excimers are evanescent, electronically excited molecular complexes which exist only under unique conditions. The excimer is in an excited state as opposed to a ground state. In this excited state, elements such as the noble gases which are normally unreactive, are able to bind to one another or to other elements. Excimers usually disintegrate within a microsecond of formation and emit their binding energy as a photon as the two elements return to the ground state. For ultraviolet applications, the excimers formed from noble gas atoms or excimers formed from a noble gas and a halogen are of particular importance. Some of the more well known ultraviolet excimers include $Ar_2$, $Kr_2$, $Xe_2$, $ArCl$, $KrCl$, $KrF$ and $XeCl$. These molecular complexes are ultraviolet excimers because the disintegration of the excimer, excited dimer, results in an emission in the ultraviolet range of the electromagnetic spectrum. For example, the emission from $KrCl$ has a wavelength of 222 nanometers ("nm"), the emission from $KrF$ has a wavelength of 248 nanometers, the emission from $Xe_2$ has a wavelength of 172 nm, and the emission from $XeCl$ has a wavelength of 308 nm. Although several ultraviolet excimers have been mentioned in reference to the present invention, those skilled in the pertinent art will recognize that other ultraviolet excimers may be employed in practicing the present invention without departing from the scope of the present invention.

An example of the excimer process for xenon is as follows. First, a xenon atom in the ground state is excited by interaction with an electron to an excited state. Next, this excited xenon atom reacts with a ground state xenon atom to form an excimer complex. Within a microsecond after formation, the xenon atoms dissociate to two ground state xenon atoms and doing so emit an ultraviolet photon.

The present invention may involve an excimer ultraviolet lamp in which a gas capable of forming excimers is hermetically sealed within a quartz glass shell. The gas may be a noble gas or a mixture of noble gas and a halogen. Electrons are generated by electrodes located outside of the shell and separated by a discharge gap. In one embodiment, the excimer ultraviolet lamp is cylindrical in shape having an aperture therethrough the center. In this embodiment, one electrode is juxtaposed to the exterior surface of the ultraviolet lamp while the second electrode is juxtaposed on the interior surface of the cylinder of the ultraviolet lamp. In another embodiment, the lamp is U-shaped.

Figure 1:
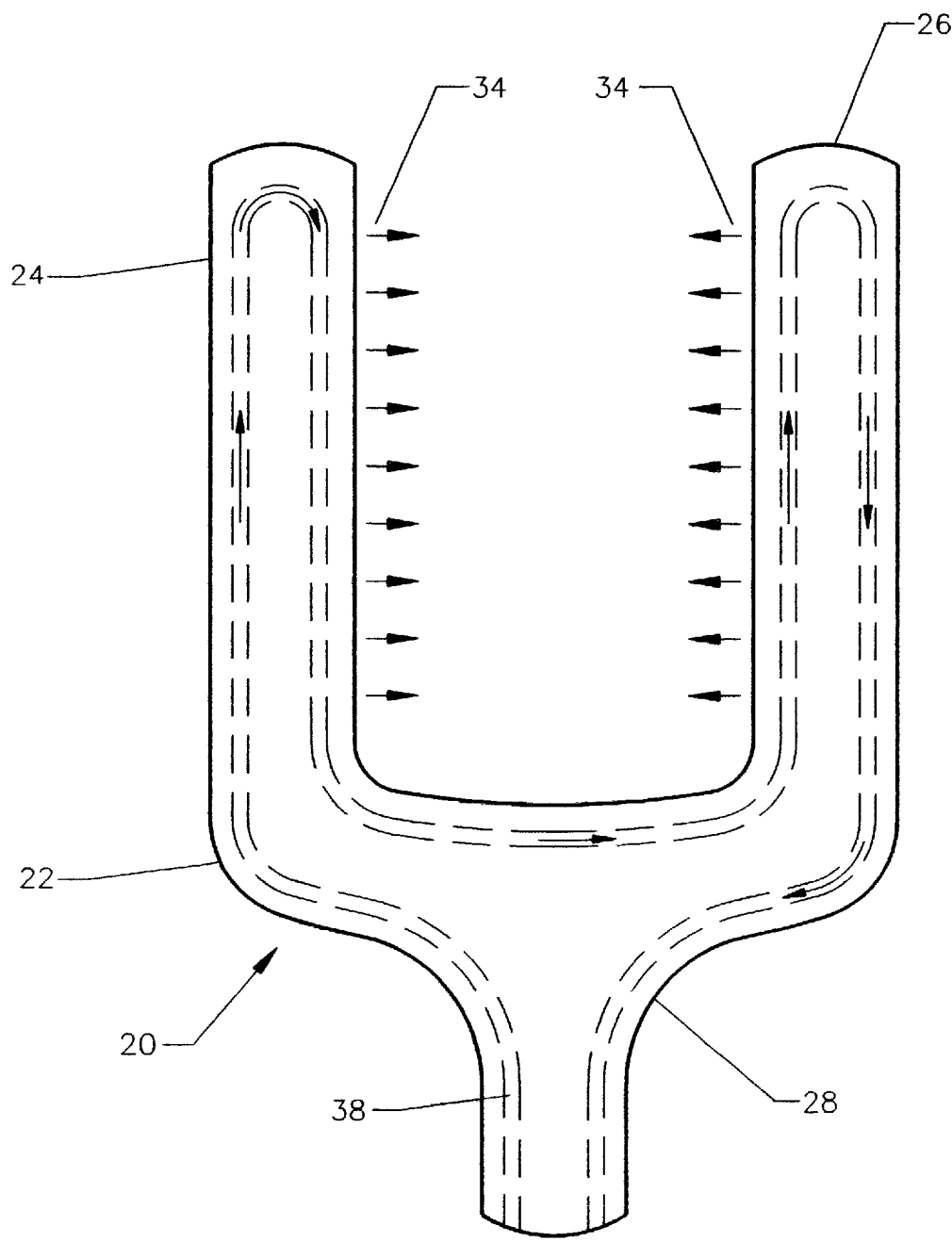

There is illustrated in FIG. 1 a top cross-section view of a preferred embodiment of an excimer ultraviolet lamp of the present invention. As shown in FIG. 1, an excimer ultraviolet lamp is generally designated 20. The excimer ultraviolet lamp 20 is generally comprised of a U shaped shell 22 having a first elongated projection 24 and a second elongated projection 26 which merge at a base 28. There is sealed within the shell 22 a gas which is reacted to form excimers. The gas is electrically excited by an alternating voltage which causes a current flow in the discharge gap established between the inner electrode 30 and the outer electrode 32, not shown. The ultraviolet radiation generated by the excimers is generally directed outward from the shell 22 as designated by arrows 34, toward a material 36 to be irradiated.

The excimer ultraviolet lamp 20 of the present invention operates at a significantly lower temperatures than traditional mercury based ultraviolet lamps. However, the excimer ultraviolet lamp 20 of the present invention still requires cooling to prevent overheating of the lamp 20 and whatever materials are being sterilized by the lamp 20. To that end, a cooling fluid flows through passageways 38 on the exterior of the lamp 20 thereby removing heat from the excimer ultraviolet lamp 20. Alternatively, the passageways 38 may be located inside of the lamp 20. The cooling fluid is maintained at a predetermined temperature which is below the operating temperature of the excimer ultraviolet lamp 20 in order for the cooling fluid to act as a heat sink to remove heat from the lamp 20.

There is illustrated in FIG. 2 a side view of an apparatus of the present invention integrated on a vertical form, fill and seal machine. As shown in FIG. 2, the excimer ultraviolet lamp 20 is integrated on a vertical form, fill and seal machine generally designated 40. A means for applying a ultraviolet radiation synergetic sterilant is generally designated 41. The means 41 for applying the sterilant may be a sprayer, a bath of the sterilant, or the like. A material 36, undergoing fabrication to a container shape and originating from a coil of material 44, passes through the means 41 to the lamp 20 and to a wiper 45 for removing any excess sterilant. On the form, fill and seal machine 40 is a filling pipe 46 which provides for the flow of a desired contents into a partially formed container. The filling pipe 46 is attached to a source of the desired contents on one end, and open on the other end for distribution of the desired contents into a partially formed container. Downstream from the filling pipe 46 is a longitudinal sealer 3 8. The longitudinal sealer 48 seals the material 36 longitudinally thereby forming an enclosed tubular material. Subsequent to the longitudinal sealer 48 is the transverse sealer 50 which seals the material transversally prior to filling with a desired contents. At the same time the bottom of one container is being sealed, the top of another container is being sealed. The filled and sealed containers are cut from the rest of the material 36 by a cutting jaw 52. Subsequent to the cutting jaw 52, the newly formed container 54 may be further manipulated into a parallelpiped container, a stand-up pouch, or the like.

As the material 36 passes by the means for applying a sterilant 41, the sterilant is applied to either one surface or both surfaces of the material 36. Next as the material 36 passes through the excimer ultraviolet lamp 20, the material 36 is sterilized by the ultraviolet radiation which is generated at a substantially monochromatic wavelength by the excimer ultraviolet lamp 20 as described above. The material 36 may be sterilized at a preferred rate of twenty centimeters per second. However, the form, fill and seal machine 40 may be operated at various rates depending on the material 36. The sterilant may be hydrogen peroxide, ozone or the like. The concentration of sterilant would correspond to the needs of the material 32 in relation to the sterilization by the excimer ultraviolet lamp 20. A preferred sterilant is hydrogen peroxide having at most a concentration of 16%. A further explanation of the use of the sterilant and ultraviolet radiation is explained below. A preferred gas for the excimer ultraviolet lamp 20 is KrCl which emits a wavelength of 222 nm. The KrCl gas excimer ultraviolet lamp 20 is utilized with a sterilant.

There is illustrated in FIG. 3 a cross-section side view of an alternative apparatus of the excimer lamp of the present invention integrated on a vertical form, fill and seal machine. As shown in FIG. 3, this embodiment of the excimer ultraviolet lamp 20 is generally cylindrical in shape having a cylindrical central aperture 27 in which a desired contents to be packaged flows therethrough. The desired contents, which is to packaged in the container fabricated on the form, fill and seal machine, is the cooling fluid which acts as a heat sink to remove heat from the lamp 20 as the desired contents flows through the central aperture 27.

The placement of the apparatus of the present invention on a vertical form, fill and seal machine provides for the sterilization of a material 36 as it undergoes fabrication into a container. In this embodiment, the lamp 20 is placed downstream of the longitudinal sealing 48 and upstream from the transverse sealing 50. The material 36 encompasses the lamp 20 as the material 36 is pulled downward for a first transverse sealing, a filling with the desired contents and then a second transverse sealing which also cuts the filled container from the other material 36 on the machine 40. However, those skilled in the pertinent art will recognize that the apparatus of the present invention may be placed at other locations on the form, fill and seal machine without departing from the scope of the present invention.

As the material 36 is pulled downward, ultraviolet radiation sterilizes the soon to be interior of a container as indicated by the radiation arrows 60. The cylindrical shape of this embodiment of the excimer ultraviolet lamp 20 provides for the substantial irradiation of the material 36 as it is pulled downward pass the lamp 20. In this manner, the material is sterilized within milliseconds thereby allowing for an accelerated operation of the form, fill and seal machine 40.

Pouch Fabrication

The present invention encompasses various packaging for flowable materials. A preferred packaging is a flexible pouch for flowable materials. An example of such a pouch is illustrated in FIG. 4. The pouch of FIG. 4 may be fabricated on a vertical form fill and seal ("VFFS") machine as previously described. A pouch embodying one aspect of the present invention is generally designated 62. The pouch 62 has a first transverse seal 64, a second transverse seal 66, a longitudinal seal 68, and an unsealed longitudinal overlap 70. Fabrication of the pouch. 62 commences with a film being fed into a VFFS machine, as described in FIG. 2, whereby it is converted into a tubular form. The film is converted to the tubular form by sealing the longitudinal edges of the film together. Prior to making the longitudinal seal 68, the film is sterilized by apparatus of the present invention as described in reference to FIG. 1. The sealing may be accomplished either by overlapping the film and sealing the film using an inside/outside seal, or by film sealing the film using an inside/inside seal. An example of a inside/outside seal is illustrated in FIG. 4 where longitudinal seal 68 overlaps the inside surface of a film with the outside surface of the film thereby creating longitudinal seal 68 and the unsealed overlap 70.

The first transverse seal 64 is formed by a sealing bar which transversely seals the bottom of pouch 62. Then, a flowable material such as fruit juice is longitudinally added to the pouch 62. The sealing bar then seals the top end of the pouch 62 thereby creating the second transverse seal 66. The sealing bar also detaches pouch 62 from the tubular film by burning through the film or by cutting through the film. An example of such a sealing bar is disclosed in Reil, U.S. Pat. No. 3,738,080, for a Packing Machine. The capacity of pouch 62 may vary from 10 milliliters to 10 liters. The present invention enables a VFFS machine to operate at a higher capacity while producing aseptic pouches. Although the present invention has been described in reference to a VFFS, those skilled in the art will recognize that other packaging machines, such as a horizontal form, fill and seal machine, without departing from the scope of the present invention.

Parallelpiped Container Fabrication

Fabrication of a parallelpiped container is similar to that of a flexible pouch. Both containers are fabricated on a vertical form, fill and seal machine from a polymer material. However, there are variations in the fabrication process and the material. The epitome of parallelpiped containers is the TETRA BRIK® which may be fabricated in a method disclosed in Niske, U.S. Pat. No. 4,848,063 for a Method Of Manufacturing Packaging Container which is hereby incorporated by reference in its entirety.

There is illustrated in FIG. 5 a parallelpiped container sterilized in accordance with the present invention. As shown in FIG. 5, the parallelpiped container is generally designated 72. The parallelpiped container 72 has a triangular flap forming panel 74, a transverse seal tab forming panel 76 and a longitudinal seal flap 78. In a preferred embodiment, the longitudinal seal creating the longitudinal seal flap 78 is made subsequent to sterilization with the excimer ultraviolet lamp 20 on a form, fill and seal machine. Also, subsequent to sterilization, the first transverse seal is made, the container 72 is filled, and a second transverse seal is made thereby creating the transverse seal tab forming panel 76. The container 72 is further manipulated to form the familiar parallelpiped shape.

Gable Top Carton Sterilization

Unlike the previously discussed containers, the gable top carton is not fabricated on vertical form, fill and seal machine. However, similar to the other containers, the gable top carton has a tubular form, albeit a square tubular form, which may be sterilized using the present invention. Similar to the other containers, the excimer ultraviolet lamp 20 may be disposed within the gable top carton thereby sterilizing the interior of the carton with ultraviolet radiation. Alternatively, an excimer ultraviolet may be substituted for the ultraviolet lamp disclosed in copending application Ser. No. 08/472,567 filed on Jun. 7, 1995 which is hereby incorporated by reference.

There is illustrated in FIG. 6 a schematic view of one embodiment of an apparatus of the present invention integrated on a conveying system for gable top cartons. There is illustrated in FIG. 7 a schematic view of an alternative embodiment of an apparatus of the present invention integrated on a conveying system for gable top cartons. As shown in FIGS. 6 and 7, a series of partially-formed cartons 80 are conveyed along a conveyor system 90. Each of the cartons 80 are erected upright having an open top 82, a top fin 84, a top score line 86 and a bottom score line 88. A means for applying a sterilant 41 is disposed along the conveyor system 90. A sterilant such as hydrogen peroxide, ozone or peracid is sprayed into the cartons 80. Then, the ultraviolet lamp 20 is placed within the interior of the carton 80 through the open top 82.

There is in flow communication with the central aperture 27 of the ultraviolet lamp 20 a cooling fluid source pipe 92 at a top end of the central aperture 27, and in the embodiment shown in FIG. 7, a discharge pipe 94 on the bottom end of the central aperture 27. The cooling fluid source pipe 92 dispenses a cooling fluid to the ultraviolet lamp 20. In the embodiment shown in FIG. 6, the cooling fluid flows down the sides of the central aperture 27 removing heat from the ultraviolet lamp 20. Then the cooling fluid flows upward through an internal discharge pipe 96, not shown, disposed within the cooling fluid source pipe 92. The cooling fluid flows upward through the internal discharge pipe 96 by a vacuum means. In this embodiment, the bottom of the carton 80 may be sealed closed for filling with a desired contents.

In the embodiment shown in FIG. 6, the cooling fluid flows from the cooling fluid source pipe 92, through the central aperture 27 and into the discharge pipe 94. In this embodiment, the bottom of the carton 80 is open allowing for the connection between the discharge pipe 94 and the central aperture 27 of the ultraviolet lamp 20. In both FIGS. 6 and 7, the score lines 86 and 88 designate where the carton 80 is folded to form the familiar gable top carton shape. The fin 84 is where the sides of the carton 80 are sealed together. In either embodiment shown in FIGS. 6 and 7, substantially all of the interior of each carton 80 is sterilized by the ultraviolet radiation generated by the excimer ultraviolet lamp 20.

There is illustrated in FIG. 8 a cross-sectional view of a transparent bottle which may be sterilized using the present invention. As shown in FIG. 8, the bottle 100 has an interior surface 102 and an exterior surface 104. The bottle 100 also has an opening 106. The means for applying a sterilant 41 applies a sterilant to the interior surface 102 of the bottle 100. Then, from the exterior, the ultraviolet lamp 20 irradiates the exterior surface 104 which permits the transmission of the radiation to the interior surface 102 thereby sterilizing the interior of the bottle 100.

Alternatively, a transparent preform sheet for the bottle 100 may be sterilized in a similar fashion by applying a sterilant to the interior surface 102 and irradiating the exterior surface 104.

The present invention will be described in the following examples which will further demonstrated the efficacy of the novel apparatus and method for sterilizing packaging material, however, the scope of the present invention is not to be limited by these examples.

EXAMPLE ONE

An investigation was performed on the microbicidal effect of $H_2O_2$ and UV (254 nm and 222 nm) combination treatment on spores for sterilization of packaging material.

In the first phase a UV lamp (a 3 mW non-monochromatic source with a peak at 254 nm) was positioned such that it was flat on the surface of the hood. The packaging material was a silicon oxide ("SiOx")-polyethylene polymer. The percent transmission of the material to various wavelengths are given in Appendix 1. A mount for the sample was constructed by cutting two square holes in a piece of cardboard, a 5×5 $cm^2$ hole inside of an 8×8 $cm^2$ hole. The 5×5 $cm^2$ hole served as the window where the sample was placed such that the UV light could penetrate the sample. The 8×8 $cm^2$ cut allowed the sample mount to be removed and replaced without changing the position of the mount over the UV lamp. The mount was held in place directly over the UV lamp using two burette stands and clamps. The height of the mount was determined using the UV meter, such that the UV intensity transmitted through the plastic material at the set height was 0.3 mW.

Polyethylene coated with SiOx on one side, a UV transparent plastic material was used for the experiment. The material was cut into 8×8 $cm^2$ squares and labeled according to the treatment it was to receive. Ten replications of each treatment was performed.

*Bacillus subtillis* A (BsA) spores was used in the experiments. The spores were diluted to $1\times10^{7.3}$ cfu/mL by pipetting 1.0 mL of $1\times10^{8.3}$ cfu/mL into 9.0 mL of phosphate buffer solution. The spores were then labeled and stored in the refrigerator. The concentration of BsA spores was checked by pour plating the following dilution's on standard plate count agar (PCA): −6, −7, −8, −6 hs, −7 hs, −8 hs, where hs=heat shock. The procedure followed is described. The original spore suspension in the eppendorf vial was vortexed to mix and suspend the spores and then the spores were diluted as shown in Table 1.

TABLE 1

| Dilution scheme and procedure used for checking the spore load in the original vial. | |
|---|---|
| Dilution | Dilution Procedure |
| −3 | 0.1 mL −1 dilution + 9.9 mL phosphate buffer |
| −5 | 0.1 mL −3 dilution + 9.9 mL phosphate buffer |
| −7 | 0.1 mL −5 dilution + 9.9 mL phosphate buffer |

Then, 5 mL of the −5 dilution and 5 mL of the −7 dilution was pipetted into sterile (autoclaved) screw cap test tubes and heat shocked for 10 minutes at 80° C. After the tubes cooled, the plating was done. The plating scheme and procedure are shown in Table 2.

TABLE 2

Plating scheme and procedure used for plating.

| Dilution Plated | Plating Procedure |
|---|---|
| −6 | Plate 0.1 mL of −5 dilution |
| −6 hs | Plate 0.1 mL of −5 hs dilution |
| −7 | Plate 1.0 mL of −7 dilution |
| −7 hs | Plate 1.0 mL of −7 hs dilution |
| −8 | Plate 0.1 mL of −7 dilution |
| −8 hs | Plate 0.1 mL of −7 hs dilution |

Finally, the plates were incubated at 32° C. for 48 hours and then counted. The plate count obtained was found to be in the expected range.

The protocol for the experiments is as follows:
1. The spores were applied onto the plastic using the 'swab out' method. After taping the plastic material, 10 mL of $1 \times 10^{7.3}$ spores/mL was pipetted onto the center of the 5×5 $cm^2$ plastic square on the polyethylene side so as to get $1 \times 10^{5.3}$ cfu/mL per 25 $cm^2$. A sterile cotton swab was soaked in sterile phosphate buffer solution and twisted against the side of the test tube to remove excess liquid. This swab was then used to spread the 10 mL of spores uniformly over the 25 $cm^2$ area of plastic.
2. Immediately after application of the spores, $H_2O_2$ was sprayed onto the spores. The concentrations of $H_2O_2$ used were 1%, 2%, 4% and 8%. A generic plastic spray bottle was used to spray the $H_2O_2$ with the nozzle set so as to spray the finest mist. The weight of $H_2O_2$ applied was checked a few times to ascertain that the amount of $H_2O_2$ applied was approximately constant. The time between application of the $H_2O_2$ and recovery of the swabs was a constant 3 minutes, including UV treatment time. A stopwatch was used to monitor this time.
3. The mounted sample was then placed directly above the UV lamp. The UV lamp and stopwatch were started simultaneously, and the UV lamp was switched off at the time specified for the desired dosage (Table 3).

TABLE 3

UV treatment variables

| Dose (mW-s) | Intensity* (mW) | Time (s) |
|---|---|---|
| 0 | 0.3 | 0 |
| 3 | 0.3 | 10 |
| 6 | 0.3 | 20 |
| 9 | 0.3 | 30 |
| 12 | 0.3 | 40 |
| 15 | 0.3 | 50 |

*Note: The intensity is the UV intensity which is transmitted through the plastic material at a set height above the UV lamp as determined by use of the UV meter.

4a. Three minutes after spraying the $H_2O_2$, the spores were recovered. The recovery procedure is as follows. A dry swab was vigorously rubbed up and down and then side to side in the 5×5 $cm^2$ area of application. This swab was then broken off and placed in 3 mL of phosphate buffer. The process was repeated using a second dry swab which was also placed in the same test tube. Just after recovery, a sterile syringe was used to deliver a drop of catalase to the 3 mL of phosphate buffer used in order to degrade the $H_2O_2$. The microbial contamination of catalase was found to be low and therefore no further steps were taken to sterilize it. The test tube was then vortexed to release the spores from the swabs and to mix the catalase and $H_2O_2$. After vortexing, the tubes were kept undisturbed for at least an hour before diluting and plating.

4b. For samples receiving only UV treatment: Immediately after UV treatment, the spores were recovered. The recovery procedure is as follows. A sterile swab was soaked in sterile phosphate buffer solution and the excess solution was pressed out by twisting the swab against the side of the test tube. The wet swab was vigorously rubbed up and down and then side to side in the 5×5 $cm^2$ area of application. This swab was then broken off and placed in 3 mL of phosphate buffer. The process was repeated using a dry swab which was also placed in the same test tube. The test tube was vortexed to release the spores from the swabs. After vortexing, the tubes were kept undisturbed for at least an hour before diluting and plating.

5. The recovered spores were pour plated using total plate count agar (PCA). 0, −1, and −2 dilutions were plated. The −1 and −2 dilutions were made by diluting 0.5 mL from the zero sample into 4.5 mL of phosphate buffer and then pipetting 1 mL of this solution for the −1 dilution and 0.1 mL for the −2 dilution. One zero plate and duplicates of the −1 and −2 dilution plates were plated. Controls were made for the media, buffer, and hood.
6. The plates were incubated at 32° C. for 48 hours.

The following controls were conducted along with the UV-$H_2O_2$ experiment described above:

Positive control—The inoculated plastic did not receive UV or $H_2O_2$ treatment. This control was done to determine the recoverable spore count (initial load). Ten positive control samples were done each time spores were applied. The recovery procedure for the positive control was the same as that followed for the UV only treatment.

Negative control—The plastic was not inoculated and it did not receive UV or $H_2O_2$ treatment. This control helped in determining the background microbial population on the plastic and contamination due to the methodology. Only a zero plate was plated for the negative controls—no dilutions were done. Ten negative control samples were done each time the spores were applied. The recovery procedure for the negative control was the same as that followed for the UV only treatment.

For phase 2, a monochromatic (222 mn wavelength) UV lamp with a surface intensity of 0.24 W per $cm^2$ was used (See Appendix 2 for lamp specifications). The lamp dimensions were 30×8 $cm^2$. A mount for the samples was constructed by cutting five holes (5×5 $cm^2$) in a cardboard within a 30×8 $cm^2$ area. The mount was held in place, 40 cm over the UV lamp using burette stands and clamps. The plastic materials used were SiOx— polyethylene and 30$\mu$ LDPE (See Appendix 1 for transmission rates).

The procedure for the preparation and application of the spores on the plastic material was the same as that followed in Phase 1. The $H_2O_2$ concentrations used were 2%, 4%, 8% and 16%. Samples were exposed for 5, 6, 8 and 10 seconds. For each time of exposure one set of samples received only UV treatment and another set received UV-Water combination treatment. One set of 30$\mu$ LDPE samples were treated with 16% $H_2O_2$ alone. Ten replications of each treatment was performed. The five samples which received the UV treatment simultaneously were recovered by the procedure described earlier. Time from spraying the $H_2O_2$ onto the first sample to the recovery of the last (fifth) sample was found to be within 15 minutes in all cases. Positive and Negative controls were also used.

The data for phase 1 was not found to follow any definite pattern. However it was observed that the log reduction (LR) dips down at 2% $H_2O_2$ concentration for an UV intensity of 6 mW-s and higher. This trend is not noticed for the UV intensities of 0 mW-s (where the LR peaks at 2%) and for 3 mW-s (the LR curve is flat). Similarly, the LR at 8% $H_2O_2$ concentration, with varying intensities of UV radiation in all cases but one at 12 mW-s was found to be lower that the LR at 4% $H_2O_2$ concentration. This is surprising as the sporicidal action of $H_2O_2$ has been found to increase with increasing concentrations. This may be due to the interaction between the UV radiation and $H_2O_2$. The UV lamp used was not monochromatic and therefore might have caused other effects that have not been taken into account.

Also, $H_2O_2$ has been found to be slow to inactivate spores at ambient temperatures being more effective at higher temperatures. The experiments were conducted at room temperature and this may have had an effect on the overall sporicidal effectiveness of $H_2O_2$ and also in its interaction with the UV radiation.

For phase 2, the log reduction did not increase significantly with increase of UV exposure time. The results from the 16% $H_2O_2$ treatment alone show a log reduction of 1.52. This indicates that the combination treatment of UV and peroxide might be producing a lower log reduction than if the two treatments were carried out individually.

The water and UV combination treatment was found to be more effective than the UV treatment alone. However, in a number of experiments the water-UV treatment is seen to be more effective than the 2% peroxide-UV treatment. This may be due to the nature of interaction between UV and peroxide; and UV and water. If this proves to be the case, spraying of water in conjunction with the UV treatment could be a cost effective method for sterilizing packaging material.

The SiOx-polyethylene polymer has a lower percent transmission at 222 nm than the 30$\mu$ LDPE polymer. However, the log reduction obtained with the SiOx polymer was found to be higher than the reduction obtained with the latter polymer for the same treatment. This may be due to the surface chemistry of the polymers and its influence in the application and recovery procedures.

All experiments were all carried out at a distance of 40 cm from the surface of the UV lamp. No significant increase in kill was observed with an increase in UV exposure time. This may be either due to the nature of UV-peroxide interactions or because a very small fraction (0.48 mW per $cm^2$) of the total lamp power (0.24 W/$cm^2$) is incident on the samples at a height of 40 cm.

APPENDIX 1

| Wavelength (nm) | Percent Transmission |
| --- | --- |
| SiOx - Polyethylene Polymer Transmission Data | |
| 200 | 32.87% |
| 222 | 73.88% |
| 250 | 85.86% |
| 300 | 87.49% |
| 30$\mu$ LDPE Transmission Data | |
| 190 | 17.12% |
| 222 | 88.45% |
| 250 | 89.30% |
| 350 | 90.44% |

TABLE 4

Results Summary of Phase 2 Experiments

| Run 4: 4 sec | Run 5: 6 sec | Run 6: 6 sec | Run 7: 8 sec | Run 8: 10 sec |
| --- | --- | --- | --- | --- |
| 0.65 | 0.69 | 0.59 | 0.36 | 0.72 |
| 0.18 | 0.21 | 0.1 | 0.2 | 0.15 |
| 1.05 | 0.89 | 0.67 | 0.8 | 0.8 |
| 0.18 | 0.1 | 0.12 | 0.1 | 0.16 |
| — | — | 0.73 | 0.63 | 0.85 |
| — | — | 0.17 | 0.11 | 0.1 |
| — | — | 0.81 | 0.86 | 0.99 |
| — | — | 0.18 | 0.09 | 0.15 |
| — | — | 1.06 | 0.78 | 1.54 |
| — | — | 0.38 | 0.09 | 0.17 |
| — | 1.83 | 1.76 | 1.57 | 2.32 |
| — | 0.13 | 0.16 | 0.31 | 0.3 |

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. An apparatus for sterilizing the interior of a pre-formed transparent container, the pre-formed transparent container having an enclosed interior, an exterior surface and an opening for accessing the interior of the pre-formed transparent container, the apparatus comprising:
   means for introducing a sterilant into the interior of the pre-formed transparent container, the sterilant selected from the group comprising ozone, peroxides and water;
   an excimer ultraviolet radiation source for irradiating the exterior surface of the pre-formed transparent container, the radiation transmitting through the exterior surface to irradiate the sterilant in the interior of the pre-formed transparent container, the excimer ultraviolet radiation having a substantially monochromatic wavelength below 254 nanometers.

2. The apparatus according to claim 1 wherein the pre-formed transparent container is a transparent bottle.

3. The apparatus according to claim 1 wherein the sterilant is hydrogen peroxide having a concentration of 1% to 55% hydrogen peroxide to water.

4. The apparatus according to claim 1 further comprising means for conveying a series of pre-formed transparent containers.

5. The apparatus according to claim 2 wherein the transparent bottle has a SiOx barrier, layer.

6. The apparatus according to claim 1 wherein the excimer ultraviolet radiation source comprises a quartz lamp containing a KrCl gas emitting ultraviolet radiation having a wavelength of 222 nanometers.

7. The apparatus according to claim 1 wherein the introducing means is a sprayer disposed above the opening of the pre-formed transparent container.

8. A method for sterilizing the interior of a pre-formed transparent container, the pre-formed transparent container having an enclosed interior, an exterior surface and an opening for accessing the interior of the pre-formed transparent container, the method comprising:
   introducing a sterilant into the interior of the of the pre-formed transparent container, the sterilant selected from the group comprising ozone, peroxides and water; and irradiating the exterior surface of the pre-formed transparent container with an excimer ultraviolet radiation source, the radiation transmitting through the exterior surface to irradiate the sterilant in the interior of the pre-formed transparent container, the excimer ultraviolet radiation having a substantially monochromatic wavelength below 254 nanometers.

9. The method according to claim 8 wherein the pre-formed transparent container is a transparent bottle.

10. The method according to claim 8 wherein the sterilant is hydrogen peroxide having a concentration of 1% to 55% hydrogen peroxide to water.

11. The method according to claim 9 wherein the transparent bottle has a SiOx barrier layer.

12. The method according to claim 8 wherein the excimer ultraviolet radiation source comprises a quartz lamp containing a KrCl gas emitting ultraviolet radiation having a wavelength of 222 nanometers.

13. The method according to claim 8 wherein the introducing the sterilant and irradiating the exterior are performed simultaneously.

14. A method of sterilizing a transparent packaging material undergoing fabrication on a form, fill and seal packaging machine, the packaging machine having a continuous roll of transparent packaging material which is longitudinally sealed to form a tubular material, transversally sealed, filled with a flowable food product and then transversally sealed again, the transparent packaging material having an interior surface and an exterior surface and, the method comprising:

dispersing a sterilant onto the interior surface of the transparent packaging material subsequent to the transparent packaging material being unwound from the continuous roll on the form, fill and seal packaging machine, the sterilant selected from the group comprising peroxides, ozone and water;

irradiating the exterior surface of the transparent packaging material with ultraviolet radiation from an excimer ultraviolet radiation source, the radiation having a substantially monochromatic wavelength less than 254 nanometers, the step of irradiating the exterior surface occurring approximately simultaneously with the step of dispersing a sterilant onto the interior surface of the transparent packaging;

removing any excess sterilant from the interior surface of the transparent packaging material subsequent to irradiating the exterior surface thereby providing a sterilized transparent packaging material for formation into a partially formed package;

filling the partially formed package with a flowable food product; and sealing the filled partially formed package.

15. The method according to claim 14 wherein the sterilant is hydrogen peroxide having a concentration of 1% to 55% hydrogen peroxide to water.

16. The method according to claim 14 wherein the transparent packaging material has a SiOx barrier layer.

17. The method according to claim 14 wherein the excimer ultraviolet radiation source comprises a quartz lamp containing a KrCl gas emitting ultraviolet radiation having a wavelength of 222 nanometers.

18. The method according to claim 14 wherein the transparent packaging material is formed into a flexible pouch.

19. The method according to claim 14 wherein the transparent packaging material is formed into a stand-up pouch.

* * * * *